May 28, 1940.  E. L. FIX  2,202,690
SAFETY GLASS
Filed July 7, 1938
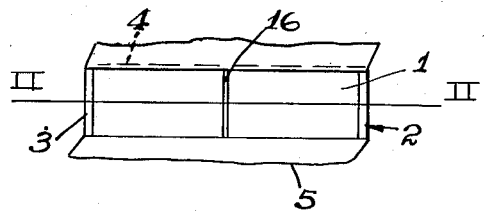
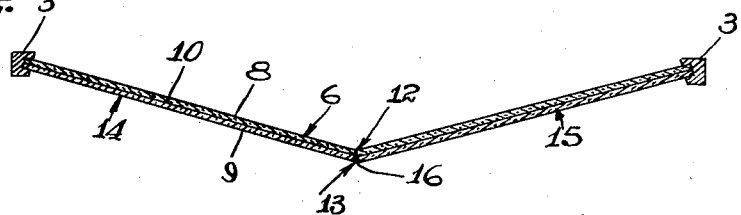
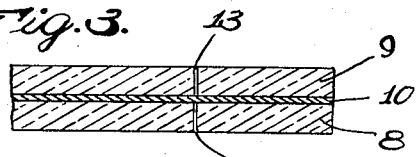
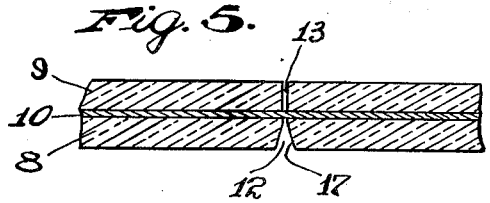
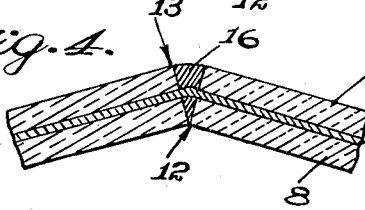
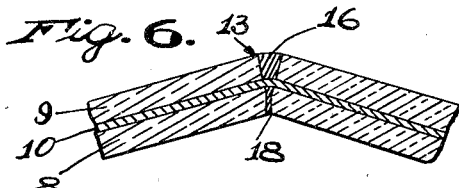
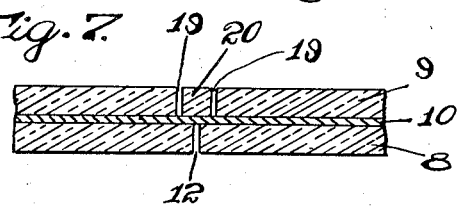
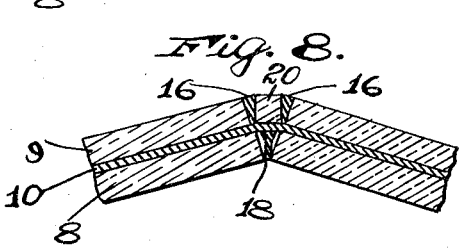
INVENTOR.
EARL L. FIX
BY Bradley & Bee
ATTORNEYS.

Patented May 28, 1940

2,202,690

UNITED STATES PATENT OFFICE 2,202,690

SAFETY GLASS

Earl L. Fix, New Kensington, Pa., assignor to Pittsburgh Plate Glass Company, Allegheny County, Pa., a corporation of Pennsylvania Application July 7, 1938, Serial No. 217,907

5 Claims. (Cl. 49—81)

The present invention relates to safety glass and more particularly to a construction embodying a plurality of sections of safety glass disposed in angular relation to provide a V type wind-shield for vehicles.

The primary object of the present invention is the provision of a panel suitable for use as a wind-shield for vehicles which panel will conform to the modern designs and at the same time afford a maximum field of visibility with few or no blind spots therein.

Other objects and advantages of the invention will become more apparent during the following detailed description of certain preferred embodiments thereof.

As the trend in automobile design has become more extreme from year to year and the advocates of "stream-line" construction have prevailed, the ordinary flat, one-piece wind-shield has become outmoded. Attempts have been made to advance curved wind-shields as a substitute for the ordinary wind-shields, but without much success. The fabrication of a curved safety glass is exceedingly difficult and the manufacturing costs are prohibitive at the present time. Accordingly the designers have been forced to look elsewhere for a solution to their problems.

Certain manufacturers have resorted to a two-piece wind-shield in which the plates are disposed angularly and are held together by a central bar or channel. This type of wind-shield conforms to the body design but the central channel or bar obstructs a portion of the field of vision of the driver and the resulting "blind spot" represents a distinct hazard.

It has now been found possible to construct an angular wind-shield from a single flat plate of safety glass in order to obviate the necessity of a central bar. The glass laminae of the safety glass are cut perpendicularly of the length, but the flexible interlayer is retained intact. The plate is bent along the cuts to the desired angle, installed in a frame, and the cuts are then sealed to complete the operation.

Certain embodiments of the invention are shown in the accompanying drawing, wherein:

Figure 1 is an isometric view of the forward portion of a vehicle in which an angular wind-shield has been installed.

Figure 2 is a sectional view taken substantially along the line II—II of Figure 1.

Figure 3 is a fragmentary sectional view on an enlarged scale of a wind-shield showing the character of the cuts therethrough.

Figure 4 is a fragmentary sectional view of the wind-shield after bending.

Figures 5 and 6 are fragmentary sectional views of a modification of the construction showing the laminated panel before and after bending.

Figures 7 and 8 are fragmentary sectional views of a further modification showing the laminated panel before and after bending.

Referring to the drawing, an angular wind-shield 1 is supported in a frame 2, which consists of upright side channels 3 and transverse channels 4, mounted in an automobile body 5. As shown in Figure 2, the wind-shield comprises a composite plate 6 including sheets 8 and 9 of glass adhered to the opposite sides of a layer 10 of resin, by application of heat and pressure. The sheets of glass are severed by cuts 12 and 13, which divide the plate 6 into sections 14 and 15, and form lines of cleavage or joints therebetween. The layer 10 of resin is retained intact throughout to provide a flexible and elastic connection between the sections 14 and 15 that will permit the latter to be moved into angular relation with respect to each other.

In order to prevent the layer 10 from being ruptured or separated from the glass sheets at the joint during the bending operation, the entire plate is heated to a temperature of from 150 to 250 degrees F., in which range of temperatures the resin interlayer is soft and pliable and may be manipulated without trouble. After the sections have been moved to the desired position, the wind-shield is mounted in its frame and the joints are sealed with a caulking compound 16 which may comprise an opaque asphaltic binder or may be of transparent resin, such as vinyl acetal.

As shown in Figures 5 and 6, in order to reduce the degree of separation of the edges of the glass at the joint 13 in the outer sheet 9 and the tension upon the resin interlayer 10 to a minimum, the edges of the joint 12 in the inner sheet 8 may be beveled or mitered as indicated at 17. This operation is readily performed by grooving with a miter wheel or sand blast along the line of the joint before the glass is cut. Obviously the converse operation is equally applicable. The mitering may be of any depth, but in order to decrease the possibility of edge chipping, it is preferred that it does not extend entirely through the glass sheet. As a further means of preventing edge chipping, a wedge 18 of plastic or caulking material is inserted in the mitered cut and thus a cushion is interposed to obviate glass to glass contact when the plate is bent.

A second modification of the invention is illustrated in Figures 7 and 8 wherein cuts 19 and 20 are formed in the outer sheet 9 of glass at equal distances from the cut 12 in the inner sheet 8, thereby producing a separate segment 21 of glass extending the entire width of the plate 6. Here again the wedge 18 is inserted within the cut 12, which may also be mitered, in order to prevent edge chipping of the glass as the plate is bent. After the plate is bent to the desired angle and placed in a frame, the cuts 19 and 20 are filled with caulking compound and are sealed.

It should also be pointed out that both glass laminae of the plate of safety glass may be severed along a plurality of lines to divide the plate into three or more sections which are united by the plastic interlayer.

The present invention is particularly applicable to that type of laminated glass in which the plastic reinforcing layer is permanently flexible and elastic, or which may be made flexible and elastic by heating. The vinyl acetal resins, including the polymerized incomplete vinyl acetals, and the acrylate resins possess the necessary physical characteristics and safety glass embodying these resins may be treated in accordance with the foregoing description. Where the plastic interlayer of safety glass does not possess this requisite degree of flexibility, attempts to bend the plate after severing the glass laminae thereof will result in a rupture or tear of the interlayer at the joint and a destruction of the union between the sections of the plate.

The layer of plastic at the joints is found to be adequately strong and durable to withstand vibration and shock in service. A sample unit was installed in a frame, held at three corners, and the fourth corner was vibrated at a high rate of speed for approximately eight hours. At the end of the test run, the wind-shield showed no sign of failure. The layer of plastic is also perfectly resistant to the passage of air and water, and even when the cuts are not sealed, no defects will develop at the joints. Accelerated exposure tests have definitely proven this point.

It will at once be obvious that the sealing or caulking strip 16 can be made very narrow, especially in the construction shown in Figure 6. Accordingly, the reduction of the field of vision through a plate of this nature will be negligible. Where the caulking material is a black substance, such as an asphaltic composition, or where a layer of black enamel is applied to the edges of the cuts before the caulking compound is inserted therein, there will be no light reflections from the cut edges to impair or disturb the vision. If it is desired the joints may be sealed with a transparent vinyl acetal resin which, because it has an index of refraction substantially equivalent to that of the glass, will also prevent undue light reflection.

A unitary angular wind-shield as contemplated by may invention meets the high standards of quality required by the automobile industry as well as the standards imposed by statutory safety regulations. It obviates the necessity of a central supporting channel and the limitation upon the field of visibility resulting from the use of such channel is no longer an important factor.

The present invention has been described in connection with its use in automobile windshields. It will be apparent, however, that this is merely one particular application of my safety glass and it may be made a part of any construction in which a curved or angular transparent barrier is desired.

Various modifications and alterations in the character of the laminated plate of safety glass, the manner and location of the cuts or joints, and the nature of the caulking materials may be resorted to without entailing a departure from my invention or the scope of the appended claims.

What I claim is:

1. A process of manufacturing a unitary angular laminated plate which comprises cutting through the glass laminae of a plate of laminated safety glass while retaining the plastic interlayer thereof intact, heating the plate sufficiently to soften the plastic interlayer, bending the heated plate to the desired angle, and installing the plate in a suitable frame.

2. A process of manufacturing a unitary angular laminated plate which comprises cutting through the glass laminae of a plate of laminated safety glass while retaining the plastic interlayer thereof intact, heating the plate to the softening point of the plastic interlayer, bending the heated plate to the desired angle, installing the bent plate in a suitable frame, and sealing the cuts with a plastic caulking compound.

3. A process of manufacturing a unitary angular laminated plate which comprises cutting through the glass laminae of a plate of laminated safety glass in which two sheets of glass are adhered to the opposite sides of a layer of an elastic synthetic resin while retaining the resin interlayer intact, heating the plate to the softening point of the resin interlayer, bending the heated plate to the desired angle, installing the bent plate in a suitable frame, and sealing the cuts with a plastic caulking compound.

4. A process of manufacturing a unitary angular laminated plate which comprises cutting through the glass laminae of a plate of laminated safety glass in which two sheets of glass are adhered to the opposite sides of a layer of plasticized incomplete vinyl acetal resin while retaining the resin interlayer intact, heating the plate to the softening point of the resin interlayer, bending the heated plate to the desired angle, installing the bent plate in a suitable frame, and sealing the cuts with a plastic caulking compound.

5. A process as defined in claim 4 in which the edges of the cut through the inner glass lamina are beveled.

EARL L. FIX.